(12) United States Patent
Sharkey et al.

(10) Patent No.: US 8,589,911 B1
(45) Date of Patent: Nov. 19, 2013

(54) INTENT FULFILLMENT

(75) Inventors: Jeffrey A. Sharkey, Mountain View, CA (US); Adam W. Powell, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/559,338

(22) Filed: Jul. 26, 2012

(51) Int. Cl.
*G06F 9/44* (2006.01)

(52) U.S. Cl.
USPC ............................................. 717/173

(58) Field of Classification Search
USPC ............... 726/15, 26; 715/730, 769, 788; 717/168, 170, 178, 173; 705/3, 14.58; 704/235; 709/203, 206, 217; 707/723
See application file for complete search history.

(56) References Cited

U.S. PATENT DOCUMENTS

| | | | |
|---|---|---|---|
| 2004/0003390 A1* | 1/2004 | Canter et al. | 717/178 |
| 2004/0010786 A1* | 1/2004 | Cool et al. | 717/170 |
| 2005/0273779 A1* | 12/2005 | Cheng et al. | 717/168 |
| 2008/0109528 A1* | 5/2008 | Knight et al. | 709/217 |
| 2009/0083646 A1* | 3/2009 | Lin et al. | 715/769 |
| 2010/0023582 A1* | 1/2010 | Pedersen et al. | 709/203 |
| 2011/0276636 A1* | 11/2011 | Cheng et al. | 709/206 |
| 2012/0005619 A1* | 1/2012 | Jung | 715/780 |
| 2012/0124476 A1* | 5/2012 | Chang | 715/730 |
| 2012/0323898 A1* | 12/2012 | Kumar et al. | 707/723 |

* cited by examiner

*Primary Examiner* — Tuan A Vu
(74) *Attorney, Agent, or Firm* — Fish & Richardson P.C.

(57) ABSTRACT

Methods, systems, and apparatus, including computer programs encoded on a computer storage medium, for receiving first user input, the first user input indicating a first intent; searching applications installed on the computing device based on the first intent; determining that none of the installed applications are capable of fulfilling the first intent; transmitting a request to a server system, the request requesting applications capable of fulfilling the first intent; receiving a list of one or more applications, each of the one or more applications being capable of fulfilling the first intent; downloading and installing a first application of the one or more applications; launching the first application; and fulfilling the first intent using the first application.

27 Claims, 3 Drawing Sheets

INTENT FULFILLMENT

TECHNICAL FIELD

This specification generally relates to intent fulfillment in computing devices.

BACKGROUND

Mobile computing continues to grow quickly as mobile computing devices, such as smart phones and tablets, add more power and features. Users of such devices may now access various services on the Internet and download applications from a third party server system. The applications can include, for example, gaming applications, electronic mail applications, text messaging applications, social media applications, music and video applications, and similar such applications. The applications can include associated intents that the respective applications are able to resolve. For example, when a user launches an intent on the device, the device attempts to find an application that is able to fulfill the intent.

SUMMARY

Innovative aspects of the subject matter described in this specification may be embodied in methods that include the actions of receiving first user input, the first user input indicating a first intent; searching applications installed on the computing device based on the first intent; determining that none of the installed applications are capable of fulfilling the first intent; transmitting a request to a server system, the request requesting applications capable of fulfilling the first intent; receiving a list of one or more applications, each of the one or more applications being capable of fulfilling the first intent; downloading and installing a first application of the one or more applications; launching the first application; and fulfilling the first intent using the first application.

Other embodiments of these aspects include corresponding systems, apparatus, and computer programs, configured to perform the actions of the methods, encoded on computer storage devices.

These and other embodiments may each optionally include one or more of the following features. For instance, one or more of the embodiments can further include receiving second user input, transmitting the request occurring in response to receiving the second user input; receiving second user input, downloading and installing the first application occurring in response to receiving the second user input; displaying the list of one or more applications on a display; searching applications installed on the computing device comprises comparing metadata associated with each application to the first intent; the metadata comprises a list of one or more intents that a respective application is able to fulfill; the first intent comprises an action field, a data field and a category field and searching comprises searching metadata of the installed applications in view of the action field, the data field and the category field; the request conveys an action field, a data field and a category field of the first intent; receiving second user input, the second user input indicating a second intent, searching the applications installed on the computing device based on the second intent, and determining that one or more of the installed applications are capable of fulfilling the second intent; receiving third user input, the third user input specifying a second application of the installed applications, launching the second application, and fulfilling the second intent using the second application; receiving third user input, in response to receiving the third user input, transmitting a second request to the server system, the second request requesting applications capable of fulfilling the second intent, receiving a second list of one or more applications, each of the one or more applications being capable of fulfilling the second intent, downloading and installing a second application of the one or more applications, launching the second application, and fulfilling the second intent using the second application; the computing device comprises at least one of a mobile telephone or a tablet computing device.

Particular embodiments of the subject matter described in this specification may be implemented so as to realize one or more of the following advantages. Manual searching for application to fulfill intents is reduced, which can result in reducing user uncertainty concerning application capability. The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

This specification describes systems, methods, computer programs, and storage media for fulfilling intents. In some examples, an intent is a description of an operation to be performed or a description of an operation that has happened. A user can initiate an intent and associated action that is to be performed by a computing device (e.g., a mobile device). Initially, the computing device can search for locally stored applications that are able to fulfill the intent. However, when the computing device does not have a stored application that can resolve the intent (or a differing application is desired to fulfill the intent), the computing device can extend the search to other applications not stored on the computing device (e.g., applications available from a server system). In some examples, the computing device can issue a request to a search service. The search service can process the request to identify one or more applications that can be used to fulfill the intent. The computing device can download and install one or more of the applications (e.g., from the server system) and can execute the application(s) to resolve the intent. In some implementations, the computing device can access the one or more applications through a connected network ("cloud-enabled applications").

By way of non-limiting example, an email address can be displayed as a selectable object to a user of a computing device, and the user desires to send an email to the displayed email address. To that end, the user can select the displayed email address indicating the user's intent to compose and send an email to the displayed address. In response to the user selection, the computing device can search for locally stored applications that are able to resolve the intent of sending an email (e.g., an email application). If the mobile device includes an installed email application that can resolve the intent, the application can be instantiated and the user can compose an email. However, if the mobile device does not have such a locally stored application, the mobile device can issue a search request to a search service. The search service can receive the request and can identify one or more email applications that are available for the mobile device and that are operable to resolve the intent. The user can download and install applications (such as an email application) that are able to resolve the intent from a server system. The mobile device can execute the email application such that the email application fulfills the intent of sending the email.

Figure 1:
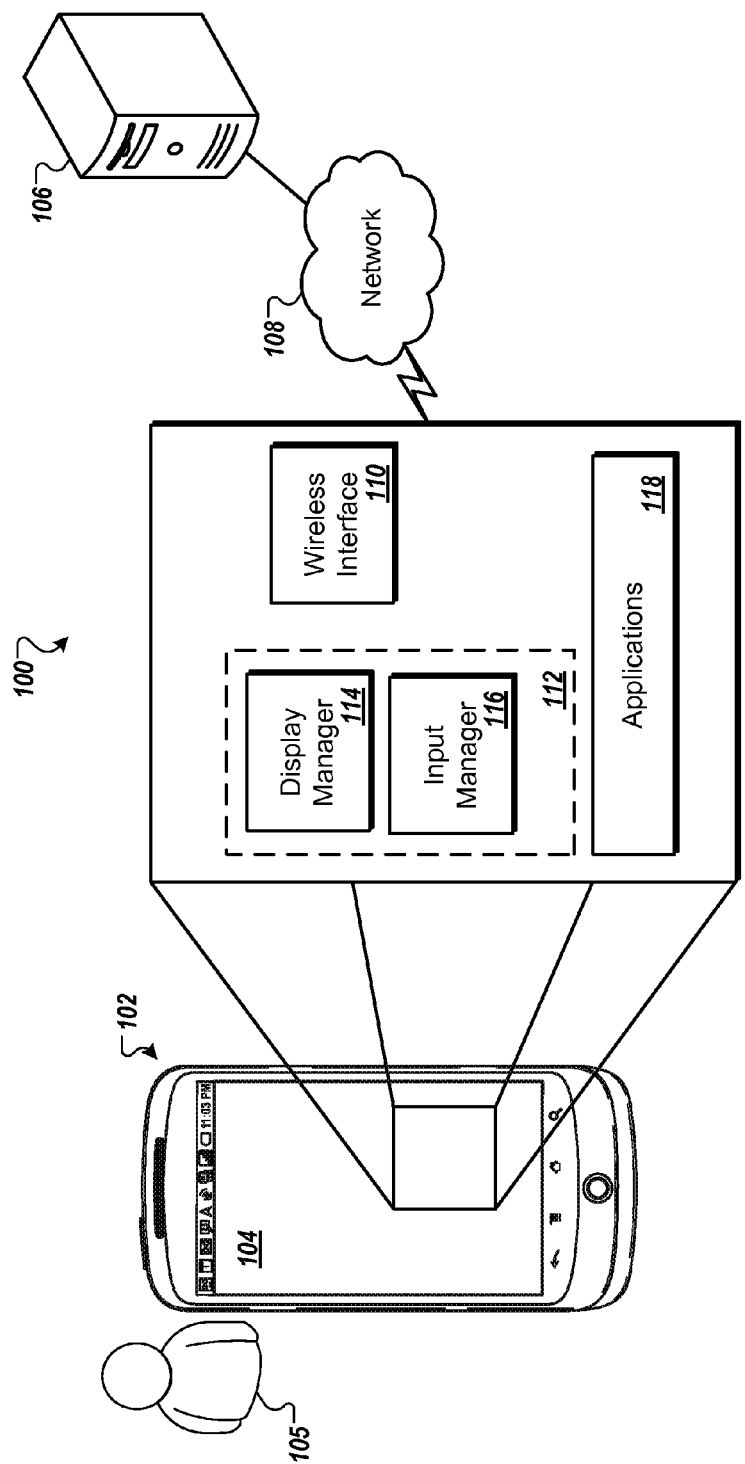
FIG. 1 is a block diagram of a system that can execute implementations of the present disclosure.

FIG. 1 is a block diagram of a system 100 that can execute implementations of the present disclosure. In general, the system 100 includes a mobile device 102 (e.g., a smart phone) with a touchscreen display 104, where the touchscreen display 104 can be used as a graphical user interface (GUI) for the mobile device 102. A number of components within the mobile device 102 provide for interaction with the mobile device 102. For purposes of clarity, FIG. 1 shows certain example components of the mobile device 102. The mobile device 102 includes an associated user 105.

The mobile device 102 can communicate with a server system 106 through a network 108 using a wireless interface 110. The network 108 can be the Internet and/or a cellular network. For example, the mobile device 102 can direct telephone calls through a telephone network or through a data network using voice over internet protocol (VOIP). In addition, the mobile device 102 can transmit other forms of data over the internet, for example, data in the form of Hypertext Transfer Protocol (HTTP) requests that are directed at particular web sites. The mobile device 102 may receive responses, for example, in forms that can include, but are not limited to, a mark-up code for generating web pages, media files, and electronic messages.

A number of components running on one or more processors included in the mobile device 102 enable a user to interact with the touchscreen display 104 to provide input and to receive visual output. For example, an interface manager 112 can manage interaction with the touchscreen display 104, and includes a display manager 114 and an input manager 116.

The display manager 114 can manage the information displayed to a user using the touchscreen display 104. For example, an operating system running on the mobile device 102 can use the display manager 114 to arbitrate access to the touchscreen display 104 for a number of applications 118 running on the mobile device 102. For example, the mobile device 102 can display a number of applications, each in its own window on the touchscreen display 104, and the display manager 114 can control what portions of each application are shown on the touchscreen display 104. In another example, the display manager can control the displaying of a virtual artifact. The input manager 116 can control the handling of user input received from the user 105 using the touchscreen display 104 or other input mechanisms.

In some implementations, the mobile device 102 enables the user 105 to interact with an application marketplace. An example application marketplace includes the Android Marketplace provided by Google Inc. In some implementations, the application marketplace can include a website that is hosted on one or more servers (e.g., the server system 106) and that is accessed using a computing device (e.g., the mobile device 102). In some implementations, the application marketplace can be provided as an application that is executed on a computing device (e.g., the mobile device 102), and that retrieves application information from one or more servers (e.g., the server system 106).

The application marketplace can advertise applications (e.g., the applications 118) that are available for download to and installation on the mobile device 102. For example, the user 105 of can interact with the application marketplace to view and/or find applications of interest. The user 105 can select a particular application (such as one of the applications 118) from the one or more displayed applications to download and install the selected application (such as one of the applications 118) on the mobile device 102.

As mentioned above, an intent can be provided as a description of an operation to be or has been performed by a computing system. Specifically, an intent (or intent object) is a passive data structure that contains information of an operation to be performed by a component, such as an application (e.g., the applications 118) or a description of something that has happened and is being announced (e.g., "broadcast intents"). An intent can include a component name, an action, data, a category, extras, and/or flags.

The component name of an intent can include the name of the component, such as an application (e.g., the applications 118), that should handle the intent. In some implementations, the component name can be a combination of the fully qualified class name of the component and the package name set in a manifest file of the component. In some implementations, the package part of the component name and the package name set in the manifest do not necessarily have to match. In some implementations, the component name is optional. Further, the component name can divide an intent into two groups, explicit intents and implicit intents. Explicit intents designate the target component (e.g., the application) by its name (e.g., the component name of the intent). Implicit intents do not designate the target component (e.g., the application).

The action of the intent is a string naming the action to be performed or, in the case of broadcast intents, the action that took place and is being reported. The data of the intent includes the uniform resource indicator (URI) of the data to be acted on and the MIME type of that data. The action of the intent can be paired with particular types of data. The category of the intent includes a string containing additional information about the kind of component (e.g., the applications 118) that should handle the intent. An intent can include any number of category descriptions. The extras of the intent include key-value pairs for additional information that should be delivered to the component handling the intent. The action of the intent can be paired with particular extras. The flags of the intent can include various sorts, such as instructions for how the system should launch the action of the intent.

The metadata of an application (e.g., the applications 118) can include a description of intent(s) that the respective application can fulfill. Specifically, each application has one or more filters. Each filter describes which intents the associated application is able to fulfill. In some implementations, an application is able to resolve more than one intent. Each filter includes fields that parallel the action, data, and category files of the intent. In some examples, the intent is tested against each field of the respective filter. In some examples, for an application to fulfill the intent, the intent must pass all three fields of the filter. In some implementations, the intent includes a single action, while the action field of the filter can list more than one action. In some examples, for the intent to pass the action field of a filter, the action specified by the intent must match one of the actions listed by the action field of the filter. In some implementations, when the action field is empty, the intent fails the action field of the filter. In some implementations, when the action specified by the intent is empty, the intent passes the action field of the filter (as long as the action field of the filter includes at least one action).

In some examples, for the intent to pass the category field, every category of the intent must match a category listed by the category field of the filter. Further, the category field of the filter can include additional categories, but cannot omit any categories that are included by the intent.

The data test compares both the URI and the data type of the intent to a URI and data type specified in the data field of the filter. In some examples, for the intent to pass the data field of the filter, one or more of the following example rules can be applied:

1. An intent that contains neither a URI nor a data (MIME) type passes the data test only if the filter likewise does not specify any URIs or data types.
2. An intent that contains a URI but no data type (and a type cannot be inferred from the URI) passes the data test only if its URI matches a URI in the data field of the filter and the data field of the filter likewise does not specify a type.
3. An intent that contains a data type but does not contain a URI passes the data test only if the data field of the filter lists the same data type and similarly does not specify a URI.
4. An intent that contains both a URI and a data type (or a data type can be inferred from the URI) passes the data test only if its type matches a type listed in the data field of the filter. It passes the URI part of the data test either if its URI matches a URI in the filter or if it has a "content:" or "file:" URI and the data field of the filter does not specify a URI. In other words, an application is presumed to support "content:" and "file:" data if its data field of the filter lists only a data type.

Figure 2:
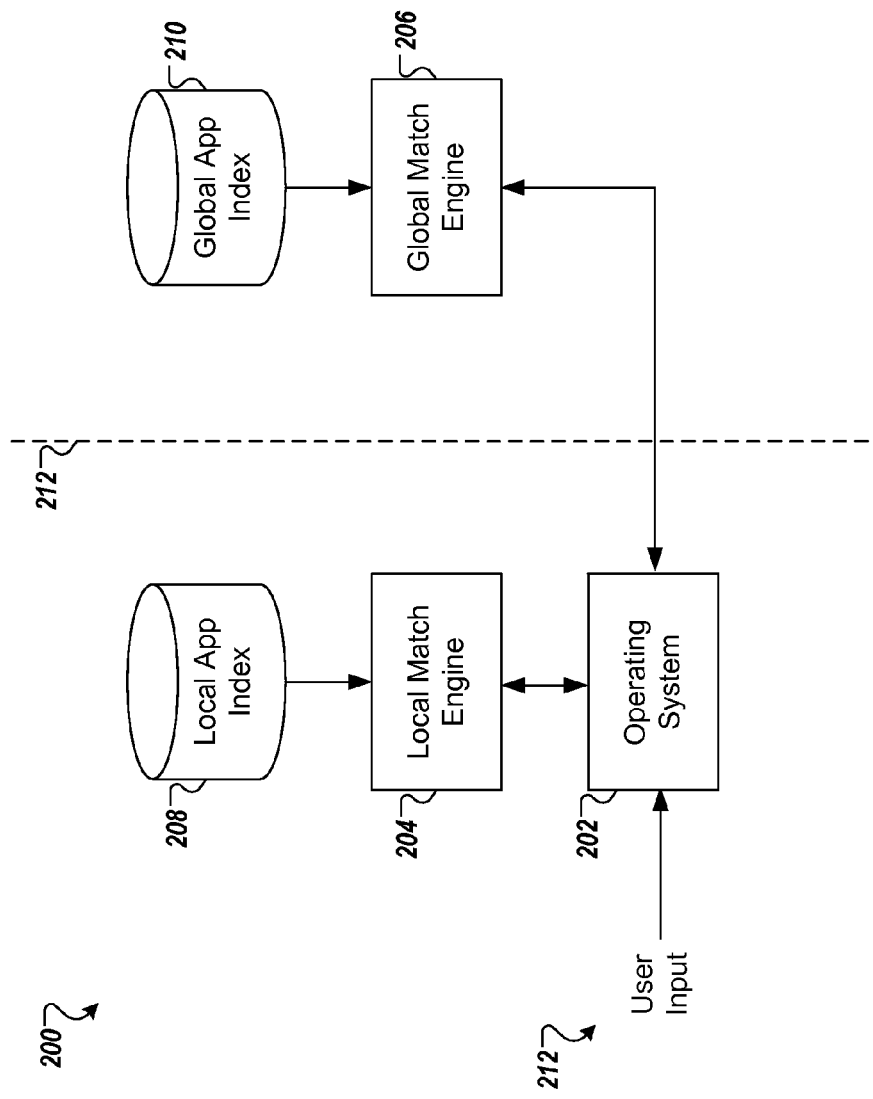
FIG. 2 depicts a block diagram of a system that includes example components for fulfilling intents.

FIG. 2 depicts a block diagram of a system 200 that includes example components for fulfilling intents. The system 200 includes an operating system 202, a local match engine 204, a global match engine 206, a local application index 208, and a global application index 210. The operating system 202, the local match engine 204, and the global match engine 206 can each be provided as one or more computer programs that are executed using one or more computing devices. The local application index 208 and the global application index 210 can be provided as one or more computer-readable storage media.

In some implementations, the system 200 can be implemented by the mobile device 102 and the server system 106. For example, the operating system 202, the local match engine 204 and the local application index 208 can be components of the mobile device 102 (e.g., "client-side" components) and the global match engine 206 and the global application index 210 can be components of the server system 106 (e.g. "server-side" or "back-end" components). The "client-side" components and the "server-side" components are depicted on opposing sides of a network boundary 212.

The local application index 208 includes applications (e.g., the applications 118) and associated metadata of the applications that are stored by the mobile device 102. The metadata of an application can include a description of intent(s) that the respective application can fulfill, as described above. Further, as mentioned above, the applications 118 stored by the mobile device 102 can be downloaded from the application marketplace. Thus, the local application index 208 can include applications and associated metadata of a portion of the applications available via the application marketplace (i.e., only the applications 118 that are downloaded to the mobile device 102 via the application marketplace).

Similarly, the global application index 210 includes applications and associated metadata of the applications that are stored by the server system 106. For example, the global application index 210 includes metadata of applications that are available via the application marketplace and available for download and installation on the mobile device 102. The global application index 210 can include metadata of all or any portion of the applications that are available on the application marketplace.

The operating system 202 receives user input 212 (e.g., via touchscreen display 104). In response to receiving the user input 212, the operating system 202 communicates with the local match engine 204 and/or the global match engine 206 depending on the user input 212. For example, the user input 212 can include the user launching an intent. In response, the operating system 202 can communicate the intent to the local match engine 204. The local match engine 204 can examine the local application index 208 to determine whether there are any applications stored by the application index 208 that are able to fulfill the launched intent, as described above. The local match engine 204 can communicate with the operating system 202 a listing of any matching applications that are able to fulfill the launched intent.

In some examples, in response to the user input 212 including the user launching an intent, the operating system 202 can communicate the intent to the global match engine 206. The global match engine 206 can examine the global application index 208 to determine whether there are any applications stored by the global application index 208 that are able to fulfill the launched intent, as described above. The global match engine 206 can communicate with the operating system 202 a listing of any matching applications that are able to fulfill the launched intent. In some implementations, the global match engine 206 communicates the listing including only matching applications that are not currently installed on the mobile device 102.

In some implementations, the operating system 202 only communicates the intent to the global match engine 206 in response to the listing of matching applications from the local match engine 204 being empty. In some implementations, the operating system 202 only communicates the intent to the global match engine 206 in response to further user input, such as user input indicating to search for further applications not on the listing of matching applications from the local match engine 204 that fulfill the launched intent.

Figure 3:
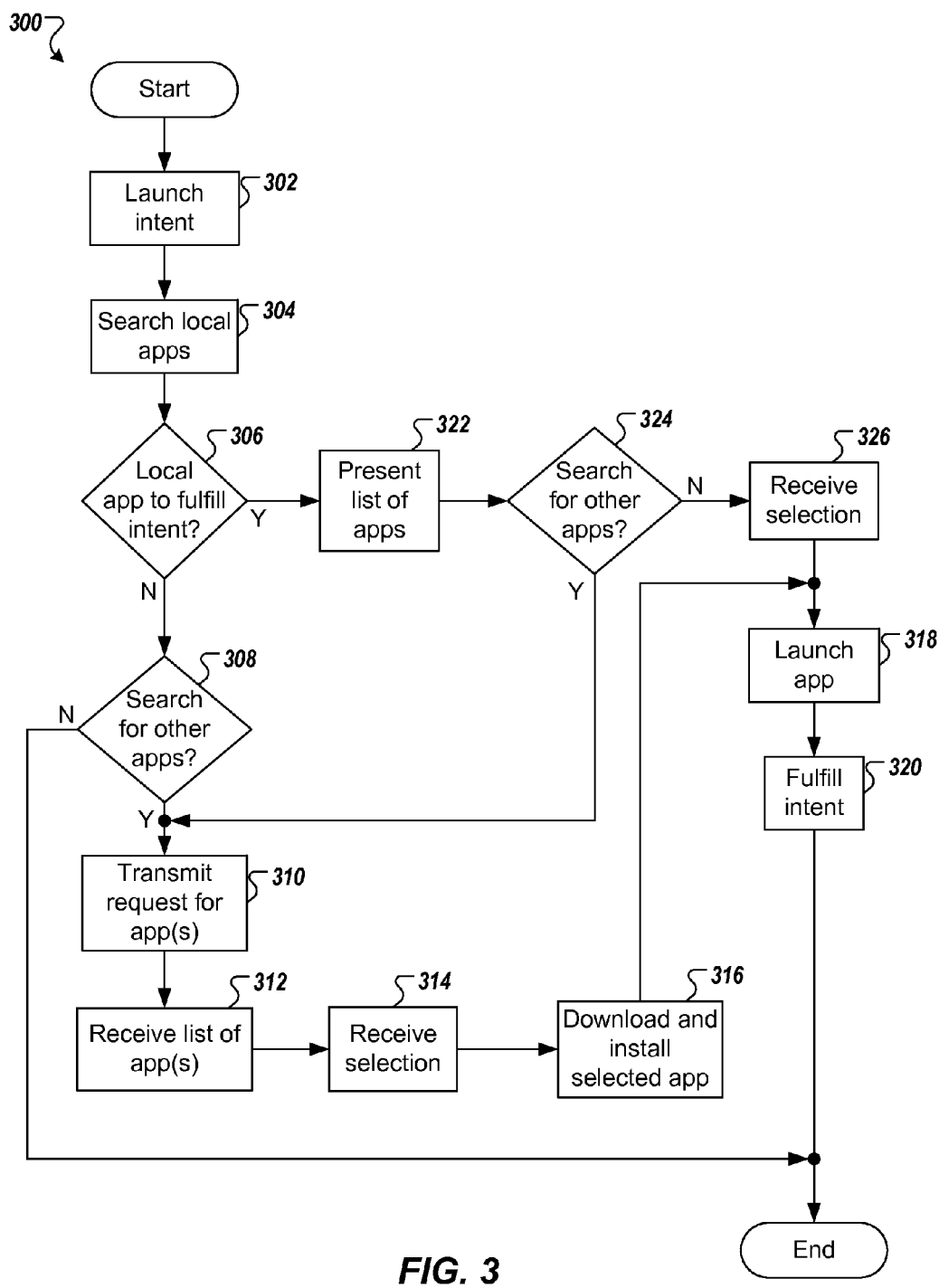
FIG. 3 is a flowchart of an example process for fulfilling intents.

FIG. 3 is a flowchart of an example process 300 for fulfilling intents. The example process 300 can be executed using one or more computing devices. For example, the mobile device 102 and/or the server system 106 can be used to execute the example process 300.

An intent is launched on a mobile device (302). Specifically, the operating system 202 can launch the intent based on the user input 212. For example, a user (e.g., user 105) selects (e.g., the user input 212) a selectable email link (e.g., an email address) to launch the intent of sending an email associated with the email link.

The mobile device searches installed (local) applications in view of the launched intent (304). Specifically, the operating system 202 can communicate the intent to the local match engine 204. The local match engine 204 can search the local application index 208, and specifically, search the metadata of installed applications (e.g., the applications 118), the metadata including the intents that each installed application is able to fulfill. In some implementations, the operating system 202 can communicate the action, data, and the category of the intent to the local match engine 204. The local match engine 204 can search the applications stored by the local application index 208 in view of the action, data, and the category of the intent. Continuing the example above, the local match engine 204 can search the metadata of the local application index 208 in view of the intent of sending an email.

The mobile device determines whether one of the installed applications is able to fulfill the intent (306). Specifically, the local match engine 204 can determine whether the metadata of one or more of the installed applications (e.g., the applications 118) of the local application index 208 is able to fulfill the intent. For example, the local match engine 204 determines whether there are any applications having metadata stored in the local application index 208 indicating that one of the applications is able to fulfill the intent of sending an email.

In response to determining that none of the installed applications are able to fulfill the intent (306), the mobile device determines whether other applications are to be searched in view of the launched intent (308). Specifically, the operating system 202 can notify the user (e.g., the user 105) via the GUI of the mobile device 102 that none of the installed applications (e.g., the applications 118) are able to fulfill the intent. Further, the operating system 202 can prompt the user (e.g., via a dialog box) to search for other applications (e.g., applications that are not installed on the mobile device 102) that are able to fulfill the intent. For example, the operating system 202 can determine that none of the installed applications (e.g., the applications 118) are capable of fulfilling the intent of sending an email. The operating system 202 notifies the user (e.g., the user 105) via the GUI that none of the installed applications are able to fulfill the intent of sending an email and further prompts the user to search for other applications that are able to send an email.

In response to the mobile device determining that other applications are to be searched in view of the launched intent (308), the mobile device transmits a request to the server system for other applications that can satisfy the launched intent (310). Specifically, the operating system 202 can communicate the intent to the global match engine 206. In some implementations, the operating system 202 can communicate the action, data, and the category of the intent to the global match engine 206. The global match engine 206 can search the applications stored by the global application index 210 in view of the action, data, and the category of the intent, as mentioned above. For example, the operating system 202 transmits a request to the global match engine 206 for other applications (e.g. applications that are not installed on the mobile device 102) that can send an email. The global match engine 206 can search the global application index 210 to determine whether there are applications stored by the global application index 210 having metadata indicating that one or more of the applications are able to send an email. In some implementations, the operating system 202 can remove any personal information associated with the user (e.g., the user 105) prior to communicating the intent to the global match engine 206.

The mobile device receives a listing of applications that are able to fulfill the launched intent located on the server system (312). Specifically, in response to the global match engine 206 searching the global application index 210 to determine whether there are applications stored by the global application index 210 that are able to fulfill the intent, the global match engine 206 can transmit the listing of applications to the operating system 102. The listing of applications can include one or more applications stored by the global match engine 206. The listing of applications can be displayed on the GUI of the mobile device 102 via the application marketplace interface. In some implementations, the listing of applications can be filtered to remove a subset of applications. For example, the global match engine 206 can filter the applications to remove applications having metadata indicating that the application can fulfill a number of intents over a threshold (e.g., the application can fulfill "too many" intents and is considered a spam application) and/or applications have a user rating below a threshold. In some implementations, the listing of applications can be sorted by any metric. For example, the listing of applications can be sorted by such metrics as applications that have a higher "popularity" (as determined by the server system 106 and/or the application marketplace), user rating, length of time of availability on the application marketplace, geographic area, or any combination thereof. Further, the applications can be sorted in view of whether the application has been downloaded and/or installed by a "friend" of the user.

The mobile device receives a selection of one of the listed applications located on the server system that is able to fulfill the launched intent (314). Specifically, the operating system 102 receives user input 212 relating to selection of one of the applications of the listing provided by the global match engine 206 via the GUI of the mobile device 102. For example, the operating system 102 receives the user input 212 of a selection of one of the applications that is able to send an email.

The mobile device downloads the selected application from the server system and installs the selected application on the mobile device (316). Specifically, the operating system 202 downloads the selected application from the global application index 210 via the global match engine 206 and installs the selected application. For example, the operating system 202 downloads the user-selected application that is able to send an email. In some implementations, in response to the operating system 202 receiving the selection of the application, the operating system 202 can prompt the user via the GUI of the mobile device 102 for confirmation of downloading and installation of the selected application.

The mobile device launches the selected application (318). Specifically, the operating system 202 launches (e.g., executes) the selected application. For example, the operating system 202 launches the application that includes the intent of being able to send an email. In some implementations, the operating system 202 launches the selected application in response to downloading and installing the selected application.

The launched application fulfills the launched intent (320). Specifically, in response to the operating system 202 launching (e.g., executing) the selected application, the selected application fulfills the launched intent. For example, the selected application is able to fulfill the intent of sending an email.

In some implementations, in response to the mobile device determining that at least one of the installed applications is able to fulfill the intent (306), the mobile device presents a listing of the applications to the user (322). Specifically, the operating system 202 presents the listing of applications stored by the local application index 208 that are able to fulfill the intent via the GUI of the mobile device 102. For example, the operating system 202 presents the listing of applications stored by the application index 208 that are able to fulfill the intent of sending an email.

The mobile device determines whether other applications are to be searched in view of the launched intent (324). Specifically, the operating system 202 can prompt the user via the GUI of the mobile device 102 whether to search for other applications (e.g., applications not installed on the mobile device 102) that can be able to fulfill the intent. In some examples, the user (e.g., the user 105) can be not satisfied with applications (e.g., the applications 118) that are currently installed on the mobile device 102 that are able to fulfill the launched intent, and thus, desires to search for other applications that can be able to fulfill the intent that are not currently installed on the mobile device 102. For example, the operating system 202 prompts the user whether to search for other applications that can send an email.

In response to the mobile device determining that other applications are to be searched in view of the launched intent (324), the mobile device transmits a request to the server system 106 for other applications that can satisfy the launched intent (310), as described above. In some implementations, the global match engine 206 filters the listing of applications to remove applications that are also stored by the local application index 208. In some implementations, the global match engine 206 also includes in the listing of applications that are stored by the local application index 208 in conjunction with applications that are only stored by the global application index 210. The process then continues with (312), (314), (316), (318) and (320), as described above.

In some implementations, in response to the mobile device determining that that other applications are not to be searched in view of the launched intent (324), the mobile device receives a selection of one of the listed applications located on the mobile device 102 that is able to fulfill the launched intent (326). Specifically, the operating system 102 receives users input 212 relating to selection of one of the applications of the listing provided by the local match engine 204 via the GUI of the mobile device 102. For example, the operating system 102 receives user input 212 of a selection of one of the applications that is able to send an email. The process then continues with (318) and (320), as described above.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computing device, comprising: one or more processors; and a computer-readable storage device coupled to the one or more processors and having instructions stored thereon which, when executed by the one or more processors, cause the one or more processors to perform operations comprising:
   receiving first user input, the first user input indicating a first intent of an operation that is to be performed by an application, the first intent including one or more fields;
   identifying one or more applications installed on the computing device, each respective application of the one or more applications configured to apply one or more respective filters, each respective filter of the one or more respective filters included in the respective application being associated with a respective field of the one or more fields of the first intent;
   comparing, for each respective application, each respective field to the respective filter that is associated with the respective field of the first intent;
   determining, for each respective application, based on the comparing, that at least one field of the intent fails a rule of the respective filter associated with the respective field of the application;
   generating, based on the determining, a first list of one applications of the one or more applications installed on the computing device;
   determining that the first list is empty; and in response to determining that the first list is empty, transmitting a request to a server system for one or more additional applications that are capable of fulfilling the first intent, the one or more additional applications differing from the one or more applications installed on the computing device.

2. The computing device of claim 1, wherein the operations further comprise receiving second user input, and wherein transmitting the request occurs in response to receiving the second user input.

3. The computing device of claim 1, wherein the operations further comprise:
   receiving a second list of the one or more additional applications from the server system, each of the one or more additional applications capable of fulfilling the first intent;
   downloading and installing a first application of the one or more additional applications;
   launching the first application; and
   fulfilling the first intent using the first application.

4. The computing device of claim 3, wherein the operations further comprise receiving second user input, and wherein downloading and installing the first application occurs in response to receiving the second user input.

5. The computing device of claim 3, wherein the operations further comprise displaying the second list of the one or more additional applications on a display.

6. The computing device of claim 1, wherein the first intent comprises an action field, a data field and a category field and comparing comprises comparing, for each respective application, each respective field of the one or more fields in view of the action field, the data field and the category field.

7. The computing device of claim 1, wherein the request conveys an action field, a data field and a category field of the first intent.

8. The computing device of claim 1, wherein the operations further comprise:
   receiving second user input, the second user input indicating a second intent of an operation that is to be performed by an application;
   comparing metadata of the one or more applications installed on the computing device with the second intent;
   generating, based on comparing the metadata of the one or more applications installed on the computing device with the second intent, a third list of applications of the one or more applications installed on the computing device that are capable of fulfilling the first intent; and
   determining that the third list includes at least one application installed on the computing device capable of fulfilling the second intent.

9. The computing device of claim 8, wherein the operations further comprise:
   receiving third user input, the third user input specifying a second application of the one or more applications installed on the computing device;
   launching the second application; and
   fulfilling the second intent using the second application.

10. The computing device of claim 8, wherein the operations further comprise:
    receiving third user input;
    in response to receiving the third user input, transmitting a second request to the server system, the second request requesting applications capable of fulfilling the second intent;
    receiving a fourth list of applications of the one or more applications that are capable of fulfilling the second intent;
    downloading and installing a second application of the applications of the fourth list;
    launching the second application; and
    fulfilling the second intent using the second application.

11. The computing device of claim 1, wherein the computing device comprises at least one of a mobile smartphone or a tablet computing device.

12. A non-transitory computer-readable medium coupled to one or more processors having instructions stored thereon which, when executed by the one or more processors, cause the one or more processors to perform operations comprising:
    receiving first user input, the first user input indicating a first intent of an operation that is to be performed by an application, the first intent including one or more fields;
    identifying one or more applications installed on the computing device, each respective application of the one or more applications configured to apply one or more respective filters, each respective filter of the one or more respective filters included in the respective application being associated with a respective field of the one or more fields of the first intent;

comparing, for each respective application, each respective field to the respective filter that is associated with the respective field of the first intent;

determining, for each respective application, based on the comparing, that at least one field of the intent fails a rule of the respective filter associated with the respective field of the first intent;

generating, based on the determining, a first list of applications of the one or more applications installed on the computing device;

determining that the first list is empty; and in response to determining that the first list is empty, transmitting a request to a server system for one or more additional applications that are capable of fulfilling the first intent, the one or more additional applications differing from the one or more applications installed on the computing device.

13. The computer-readable medium of claim 12, wherein the operations further comprise receiving second user input, and wherein transmitting the request occurs in response to receiving the second user input.

14. The computer-readable medium of claim 12, wherein the operations further comprise:
receiving a second list of the one or more additional applications from the server system, each of the one or more additional applications capable of fulfilling the first intent;
downloading and installing a first application of the one or more additional applications;
launching the first application; and
fulfilling the first intent using the first application.

15. The computer-readable medium of claim 14, wherein the operations further comprise receiving second user input, and wherein downloading and installing the first application occurs in response to receiving the second user input.

16. The computer-readable medium of claim 12, wherein the first intent comprises an action field, a data field and a category field and comparing comprises comparing, for each respective application of the one or more applications, each respective field of the one or more fields in view of the action field, the data field and the category field.

17. The computer-readable medium of claim 12, wherein the request conveys an action field, a data field and a category field of the first intent.

18. The computer-readable medium of claim 12, wherein the operations further comprise:
receiving second user input, the second user input indicating a second intent of an operation that is to be performed by an application;
comparing metadata of the one or more applications installed on the computing device with the second intent;
generating, based on comparing the metadata of the one or more applications installed on the computing device with the second intent, a third list of applications of the one or more applications installed on the computing device that are capable of fulfilling the first intent; and
determining that the third list includes at least one application installed on the computing device capable of fulfilling the second intent.

19. The computer-readable medium of claim 18, wherein the operations further comprise:
receiving third user input, the third user input specifying a second application of the one or more applications installed on the computing device;
launching the second application; and
fulfilling the second intent using the second application.

20. A computer-implemented method, comprising: receiving first user input, the first user input indicating a first intent of an operation that is to be performed by an application, the first intent including one or more fields;
identifying one or more applications installed on the computing device, each respective application of the one or more applications configured to apply one or more respective filters, each respective filter of the one or more respective filters included in the respective application being associated with a respective field of the one or more fields of the first intent;
comparing, for each respective application, each respective field to the respective filter that is associated with the respective field of the first intent;
determining, for each respective application, based on the comparing, that at least one field of the intent fails a rule of the respective filter associated with the respective field of the first intent;
generating, based on the determining, a first list of applications of the one or more applications installed on the computing device;
determining, by one or more processors, the first list is empty; and in response to determining that the first list is empty, transmitting a request to a server system for one or more additional applications that are capable of fulfilling the first intent, the one or more additional applications differing from the one or more applications installed on the computing device.

21. The method of claim 20, further comprising receiving second user input, and wherein transmitting the request occurs in response to receiving the second user input.

22. The method of claim 20, further comprising:
receiving a second list of the one or more additional applications from the server system, each of the one or more additional applications capable of fulfilling the first intent;
downloading and installing a first application of the one or more additional applications;
launching the first application; and
fulfilling the first intent using the first application.

23. The method of claim 22, further comprising receiving second user input, and wherein downloading and installing the first application occurs in response to receiving the second user input.

24. The method of claim 20, wherein the first intent comprises an action field, a data field and a category field and comparing comprises comparing, for each respective application of the one or more application, each respective field of the one or more fields in view of the action field, the data field and the category field.

25. The method of claim 20, wherein the request conveys an action field, a data field and a category field of the first intent.

26. The method of claim 20, further comprising:
receiving second user input, the second user input indicating a second intent of an operation that is to be performed by an application;
comparing metadata of the one or more applications installed on the computing device with the second intent;
generating, based on comparing the metadata of the one or more applications installed on the computing device with the second intent, a third list of applications of the one or more applications installed on the computing device that are capable of fulfilling the first intent; and determining that the third list includes at least one application installed on the computing device capable of fulfilling the second intent.

27. The method of claim 26, further comprising:

receiving third user input, the third user input specifying a second application of the one or more applications installed on the computing device;

launching the second application; and fulfilling the second intent using the second application.

* * * * *